Nov. 3, 1942.   E. I. POLLARD   2,300,520
DAMPER WINDING
Filed April 11, 1941
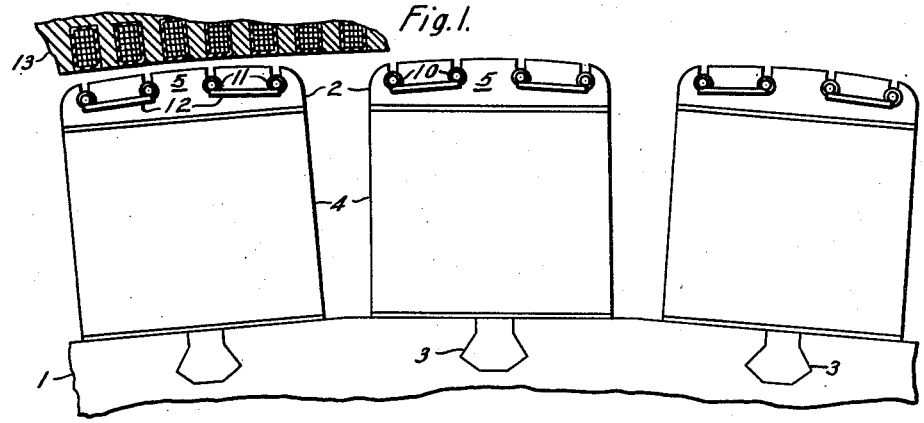
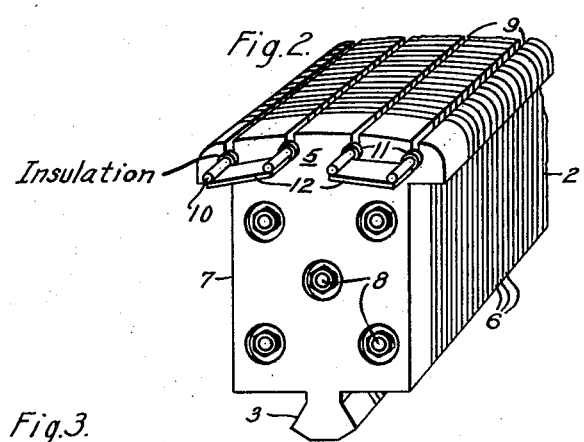
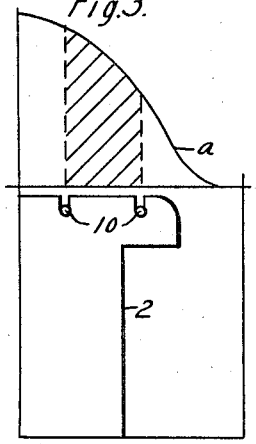
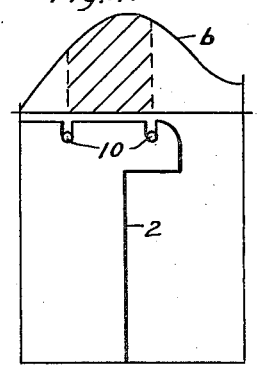
WITNESSES:
INVENTOR
Ernest I. Pollard.
BY
ATTORNEY Patented Nov. 3, 1942

2,300,520

UNITED STATES PATENT OFFICE 2,300,520

DAMPER WINDING

Ernest I. Pollard, Irwin, Pa., assignor to Westinghouse Electric & Manufacturing Company, East Pittsburgh, Pa., a corporation of Pennsylvania Application April 11, 1941, Serial No. 388,054

6 Claims. (Cl. 172—120)

The present invention relates to damper windings for synchronous dynamo-electric machines, and, more particularly, to a damper winding of the type in which there are no connections between the damper bars on adjacent pole pieces.

In the usual design of synchronous machines with salient pole rotor members, a damper winding is provided on the rotor which consists of a plurality of bars placed in slots in the pole faces and connected together at their ends by short-circuiting end rings or segments to form a winding similar to a squirrel cage winding, the segments on adjacent pole pieces being connected together by brazed or bolted connections. In the case of large salient pole machines, such as waterwheel driven generators, where the rotors are of large diameter and the peripheral speeds are quite high, it is sometimes considered desirable to omit the connections between damper bars on adjacent pole pieces because of the mechanical difficulties encountered with these connections due to the high speed, and also because the omission of the connections between poles makes possible a material decrease in the cost of the rotor.

In the conventional type of damper winding with the bars connected together between adjacent poles, substantially all the flux produced by both the direct axis and quadrature axis components of the armature current is linked by the damper winding, and the sub-transient reactances on both axes are approximately equal since the flux linkages are substantially the same. When the connections between adjacent pole pieces are omitted, however, most of the direct axis flux is still linked by the damper winding, but only a very small part of the quadrature axis flux is linked by the winding, so that the quadrature axis flux is much higher than the direct axis flux, and the quadrature axis sub-transient reactance is, therefore, also higher than the direct axis sub-transient reactance, the ratio of these reactances in most cases being approximately 1.6. This condition is undesirable since in case of a single-phase fault on the system to which the generator is connected, the difference in the sub-transient reactances may cause very high peak voltages to occur on the unfaulted phase if the line impedance is such that there is a condition of resonance for some harmonic in the voltage of the unfaulted phase.

In my prior application, Serial No. 282,157, filed June 30, 1939, Patent No. 2,280,974, issued April 28, 1942, and assigned to Westinghouse Electric & Manufacturing Company, there is disclosed and claimed a damper winding which has no connections between the bars on adjacent pole pieces and in which the damper bars are so arranged that they link a much greater part of the quadrature axis flux than in the conventional arrangement, so that the quadrature axis sub-transient reactance is materially reduced, and ratios of quadrature axis to direct axis sub-transient reactance as low as 1.3 can be obtained. The present invention provides a damper winding having no connections between adjacent pole pieces in which the damper bars are so arranged and connected that the ratio of the sub-transient reactances is approximately equal to unity, thus giving substantially equivalent performance to that of a conventional damper winding with connections between the adjacent pole pieces.

The principal object of the invention, therefore, is to provide a damper winding for a salient pole dynamo-electric machine in which there are no connections between the damper bars on adjacent pole pieces and in which the direct axis and quadrature axis sub-transient reactances are substantially equal.

A further object of the invention is to provide a damper winding in which there are no connections between adjacent pole pieces and in which the damper bars are arranged and connected so that their linkages with the direct axis flux and with the quadrature axis flux are approximately the same.

More specifically, the object of the invention is to provide a damper winding which has no connections between the bars on adjacent pole pieces and in which the bars are arranged and connected to link only a part of the direct axis flux. Thus the damper winding has only a relatively small damping effect on this flux and the direct axis sub-transient reactance is only slightly less than the transient reactance. The bars are also located so that they link a substantial portion of the quadrature axis flux and thus have a considerable damping effect on it, so that the quadrature axis sub-transient reactance is materially reduced from what it would be with the conventional arrangement of damper bars. By arranging and connecting the damper winding in this manner, the direct axis sub-transient reactance and the quadrature axis sub-transient reactance can be made approximately equal, and a performance under short-circuit conditions which is substantially equal to that of the usual damper winding with connections between the pole pieces can be obtained.

The invention will be more fully understood from the following detailed description, taken in connection with the accompanying drawing, in which:

Figure 1 is a fragmentary elevation of a portion of the rotor of a large dynamo-electric machine;

Fig. 2 is a perspective view of one end of a single pole piece, showing the arrangement of the damper winding; and Figs. 3 and 4 are illustrative diagrams showing the effect of the winding of the present invention.

The drawing shows a damper winding for a large synchronous alternating-current dynamo-electric machine, such as a waterwheel generator. The generator has a suitable stator member, indicated at 13, having a polyphase winding placed in slots in its periphery, and has a rotor member which consists of a spider 1, of any desired construction, on which are supported a plurality of salient pole pieces 2 secured to the spider by means of dovetails 3. A direct current field winding 4, of any suitable type, is placed on each of the pole pieces 2 and a damper winding, generally indicated at 5, is placed in the peripheral faces of the pole pieces.

The arrangement and connection of the damper winding are shown more clearly in Fig. 2, which is a perspective view of one end of a single pole piece, the other end being of identical construction. As shown in this figure, the pole piece 2 is built up of a plurality of laminations 6 which are clamped between end plates 7 by means of clamping bolts 8, or in any other desired manner. A plurality of longitudinal slots 9 are provided in the peripheral face of the pole piece, and damper bars 10 of copper, or other suitable conducting material, are placed in these slots. Each of the bars 10 is insulated from the pole piece 2 by means of a cover or sleeve 11 of any suitable insulating material which fits over the bar and completely insulates it from the pole piece. In the embodiment of the invention shown in the drawing, four damper bars are provided on each pole piece, and they are connected together in pairs to form two independent groups of damper bars on each pole piece. This connection is made by means of copper segments 12 which are brazed or soldered to both ends of each pair of damper bars, the segments 12 being spaced away from the end plate 7 so that the damper winding is completely isolated electrically from the pole piece. Larger numbers of damper bars 10 might be used, if desired, and connected together as described above in two independent groups lying on opposite sides of the center line of the pole, and insulated from the pole piece so as to prevent any electrical connection between the two groups of damper bars.

The effect of this arrangement of the winding is illustrated diagrammatically in Figs. 3 and 4. In Fig. 3 the curve $a$ represents the distribution of the flux produced by the direct axis component of the armature current, and the shaded area under the curve shows the portion of this flux which is linked by the independently connected group of damper bars shown. It will be seen that this area represents only a relatively small part of the total direct axis flux, and the dampening effect of the circulating currents in the damper winding induced by this flux is, therefore, relatively small, so that the direct axis sub-transient reactance is only slightly less than the transient reactance.

In Fig. 4 the curve $b$ represents the distribution of the flux produced by the quadrature axis component of the armature current, and the shaded area under this curve represents the proportion of the total quadrature axis flux which is linked by the same independent group of damper bars shown in Fig. 3. It will be seen that a substantial part of this flux is linked by the damper winding, and thus a considerable damping effect is produced which materially diminishes the quadrature axis flux, so that the quadrature axis sub-transient reactance is materially less than it would be with the conventional arrangement of damper bars in which only a very small part of the quadrature axis flux is linked by the damper winding when connections between the pole pieces are omitted. Thus, since the direct axis sub-transient reactance is only slightly diminished and the quadrature axis sub-transient reactance is greatly reduced from the value it would have with the conventional arrangement of damper bars, it is apparent that, by properly locating the bars, the values of these two reactances can be made very nearly the same, and a ratio of approximately unity can be obtained.

It will be apparent that the invention is not restricted to the exact details of construction shown and described, but is capable of various modifications. Thus, any suitable number of damper bars can be used and the end connections can be made in any desired way, the essential feature of the invention being that the bars on each pole piece are insulated from the pole piece and are connected in two independent groups lying at opposite sides of the center of the pole so that their flux linkage with the direct axis flux is relatively small. Obviously, many modifications may be made without departing from the spirit of the invention, and it is to be understood, therefore, that the invention is not limited to the exact details of construction shown, but in its broadest aspect it includes all equivalent embodiments and modifications which come within the scope of the appended claims.

I claim as my invention:

1. A synchronous, alternating-current dynamo-electric machine having a relatively rotatable main-winding member and a salient-pole field-member, each of the salient pole-pieces having two groups of a plurality of damper bars disposed in slots in its peripheral face, one group on each side of the center-line of the pole piece, separate connection-means at each end of each pole piece for connecting the bars of each group, with no electrical connection between the different groups of bars, either on the same pole piece or on different pole pieces.

2. A synchronous, alternating-current dynamo-electric machine having a relatively rotatable main-winding member and a salient-pole field-member, each of the salient pole-pieces having two groups of a plurality of damper bars disposed in slots in its peripheral face, one group on each side of the center-line of the pole piece, separate connection-means at each end of each pole piece for connecting the bars of each group, the different groups of bars being insulated from each other.

3. A synchronous, alternating-current dynamo-electric machine having a relatively rotatable main-winding member and a salient-pole field-member, each of the salient pole-pieces having two groups of a plurality of damper bars disposed in slots in its peripheral face, one group on each side of the center-line of the pole piece, separate connection-means at each end of each pole piece for connecting the bars of each group, each of said groups of bars being insulated from the pole piece and having no electrical connection with the other groups of bars either on the same pole piece or on different pole pieces.

4. A damper winding for a dynamo-electric machine having a rotor member with a plurality of salient pole pieces thereon, said winding comprising a plurality of damper bars disposed in slots in the pole faces; means for connecting the damper bars on each pole piece together at both ends in two independent groups, one group on each side of the center-line of the pole piece, said independent groups of damper bars having no electrical connection with each other.

5. A damper winding for a dynamo-electric machine having a rotor member with a plurality of sailent pole pieces thereon, said winding comprising a plurality of damper bars disposed in slots in the pole faces; means for connecting the damper bars on each pole piece together at both ends in two independent groups, one group on each side of the center-line of the pole piece, said independent groups of damper bars being insulated from each other.

6. A damper winding for a dynamo-electric machine having a rotor member with a plurality of salient pole pieces thereon, said winding comprising a plurality of damper bars disposed in slots in the pole faces and insulated therefrom, means for connecting the damper bars on each pole piece together at both ends in two independent groups, one group on each side of the center-line of the pole piece, said independent groups of damper bars having no electrical connection with each other.

ERNEST I. POLLARD.